United States Patent
Weyandt et al.

(10) Patent No.: US 7,744,021 B2
(45) Date of Patent: Jun. 29, 2010

(54) CARWASH SPRAY NOZZLE AND WASHING SYSTEM USING SAME

(75) Inventors: Thomas E. Weyandt, Northville, MI (US); Barry S. Turner, Novi, MI (US)

(73) Assignee: Belanger, Inc., Northville, MI (US)

( * ) Notice: Subject to any disclaimer, the term of this patent is extended or adjusted under 35 U.S.C. 154(b) by 893 days.

(21) Appl. No.: 11/371,484

(22) Filed: Mar. 9, 2006

(65) Prior Publication Data

US 2007/0221759 A1 Sep. 27, 2007

(51) Int. Cl.
*B05B 1/14* (2006.01)
*B05B 1/00* (2006.01)
*F23D 14/68* (2006.01)

(52) U.S. Cl. .................. 239/590.3; 239/600; 239/553.3

(58) Field of Classification Search .............. 239/590.3, 239/553, 383, 381, 449, 447, 562, 557, 591, 239/600, 590, 436, 390, 548, 17, 19, 223
See application file for complete search history.

(56) References Cited

U.S. PATENT DOCUMENTS

| | | | | |
|---|---|---|---|---|
| 2,402,741 | A * | 6/1946 | Draviner | 239/533.14 |
| 3,195,569 | A * | 7/1965 | Seaquist | 137/553 |
| 3,339,563 | A * | 9/1967 | Ordonez | 134/57 R |
| 3,409,030 | A * | 11/1968 | Schmidt | 134/123 |
| 3,542,142 | A * | 11/1970 | Hasiba et al. | 175/67 |
| 3,734,410 | A * | 5/1973 | Bruno | 239/381 |
| 4,307,840 | A * | 12/1981 | Schulze et al. | 239/451 |
| 4,806,172 | A * | 2/1989 | Adaci et al. | 134/34 |
| 4,893,752 | A * | 1/1990 | Spink et al. | 239/427.3 |
| 5,172,862 | A * | 12/1992 | Heimann et al. | 239/114 |
| 5,213,267 | A * | 5/1993 | Heimann et al. | 239/446 |
| 5,226,605 | A * | 7/1993 | Bazergui et al. | 239/1 |
| 5,421,517 | A * | 6/1995 | Knudson et al. | 239/225.1 |
| 5,427,318 | A * | 6/1995 | Lee | 239/533.15 |
| 5,450,647 | A * | 9/1995 | Dorsey | 15/97.1 |
| 5,617,886 | A * | 4/1997 | Mathieus | 134/172 |

(Continued)

FOREIGN PATENT DOCUMENTS

CN 1727235 A * 2/2006

(Continued)

*Primary Examiner*—Dinh Q Nguyen
*Assistant Examiner*—Justin Jonaitis
(74) *Attorney, Agent, or Firm*—Young, Basile, Hanlon & MacFarlane, PC

(57) ABSTRACT

A high velocity, multiple-jet spray nozzle for use in carwash systems. Each nozzle comprises the axial unitary combination of a base, a nozzle carrier and a face plate. An inlet and a chamber are formed in the body and axially aligned flow passages are formed in the nozzle carrier and face plate so that when the components are assembled, five parallel jets arranged in a circular pattern are defined between the chamber and the outer surface of the face plate. Stainless steel nozzle inserts are press fit into the flow passages of the nozzle carrier and are held in place by the face plate. Screws hold the assembly together. The nozzles are preferably used in multiples to define a wide stream of washing fluid which can be used to attach mud, ice and other debris on the surfaces of a vehicle as well as on wheels and undercarriage. Each nozzle has an alignment axis marked on the face plate along which the spacing between adjacent nozzle outlets is uniform.

12 Claims, 4 Drawing Sheets

U.S. PATENT DOCUMENTS

| | | | | |
|---|---|---|---|---|
| 5,647,537 | A * | 7/1997 | Bergmann | 239/383 |
| 5,702,057 | A * | 12/1997 | Huber | 239/288.3 |
| 5,730,362 | A * | 3/1998 | Cordes | 239/123 |
| 6,241,166 | B1 * | 6/2001 | Overington et al. | 239/553.3 |
| 6,328,228 | B1 * | 12/2001 | Bossini | 239/390 |
| 6,378,790 | B1 * | 4/2002 | Paterson et al. | 239/456 |
| 6,412,710 | B1 * | 7/2002 | Lin et al. | 239/436 |
| 6,412,711 | B1 * | 7/2002 | Fan | 239/446 |
| 7,237,726 | B2 * | 7/2007 | Yu | 239/290 |
| 7,384,007 | B2 * | 6/2008 | Ho | 239/570 |
| 2002/0109023 | A1 * | 8/2002 | Thomas et al. | 239/562 |
| 2004/0104287 | A1 | 6/2004 | Drechsel | 239/600 |
| 2005/0263617 | A1 * | 12/2005 | Thong | 239/383 |

FOREIGN PATENT DOCUMENTS

| | | | |
|---|---|---|---|
| DE | 20113162 U | * | 1/2003 |
| DE | 20113162 U1 | * | 1/2003 |

\* cited by examiner

CARWASH SPRAY NOZZLE AND WASHING SYSTEM USING SAME

FIELD OF THE INVENTION

This invention relates to carwash systems and more particularly to a high velocity multiple jet spray nozzle for use in car wash systems and similar applications.

BACKGROUND OF THE INVENTION

Commercial car washes use various systems for removing dirt, snow and ice from vehicles. Rotating brushes and hanging fabric strips are used for this purpose. In addition, high pressure sprays, often in the form of hand carried wands, are also used for particularly heavy accumulations of dirt or ice at or near the entrance of a car wash installation. Non-contacting, all-pressure spray washes are also popular.

SUMMARY OF THE INVENTION

The present invention provides a high-velocity, multiple jet spray nozzle for carwash installations and similar applications. This nozzle is suitable for use in multiples to provide a highly effective scrubbing action and/or debris removal action on vehicle external surfaces as well as on wheels and undercarriage components.

In general, the nozzle of the present invention comprises a body having a fluid inlet and a chamber. A generally circular array of small diameter outlets from the chamber produce a generally circular group of spray jets which causes high velocity fluid, water or chemically loaded water, to flow in highly collimated fashion toward the surface of a vehicle.

In the preferred form the nozzle comprises a bare body, a nozzle insert carrier and a cover plate which is sealingly attached to the nozzle carrier to hold the nozzle inserts in place. The cover plate also has flow passages formed therein which align with the flow passages of the nozzle inserts but are substantially larger in diameter so that the highly collimated jets of fluid emerging from the nozzle inserts do not actually touch the cylindrical sides of the fluid passages in the cover plate.

In the preferred embodiment illustrated herein, the fluid passages and nozzle inserts are circularly arranged, the base and cover plate are made of aluminum and the nozzle inserts are made of stainless steel. The nozzle carrier is made of plastic and the entire assembly is held together by a circular arrangement of screws passing through holes which are coaxial with the fluid inlet. The locations of the nozzle passages are chosen to create a uniform spacing between passages along an axis perpendicular to the direction of relative movement between the nozzle and the vehicle.

In another aspect of the invention, a plurality of nozzles of the type described above are arranged in adjacent parallel fashion to direct highly collimated jets of cleaning fluid, water alone or water with chemicals, onto the various surfaces of a vehicle. These nozzles are arranged so that the flow patterns between adjacent nozzles provide an essentially continuous swath of cleaning action on a vehicle passing the nozzle array. As shown herein the nozzle arrays may be vertical or horizontal or beneath the vehicle to clean the undercarriage.

DETAILED DESCRIPTION OF THE ILLUSTRATIVE EMBODIMENT

Figure 1:
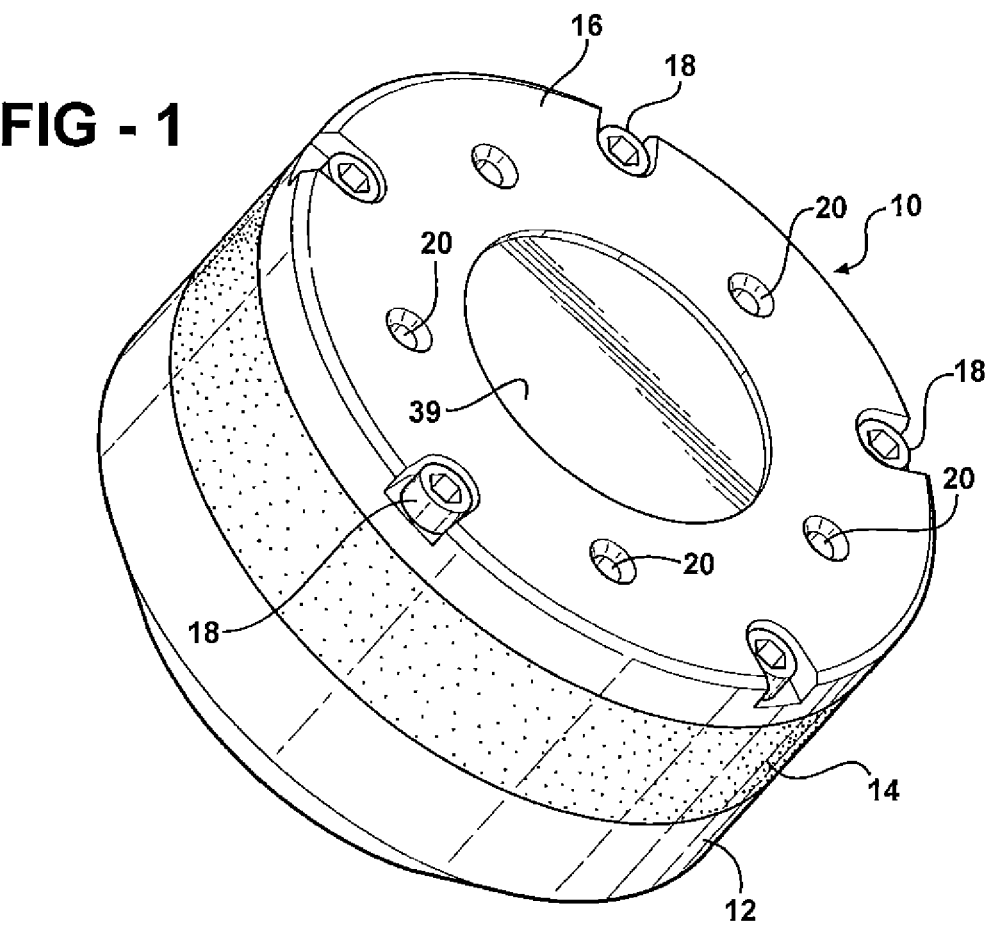
FIG. 1 is a perspective view of a nozzle constructed in accordance with the invention.
Figure 3:
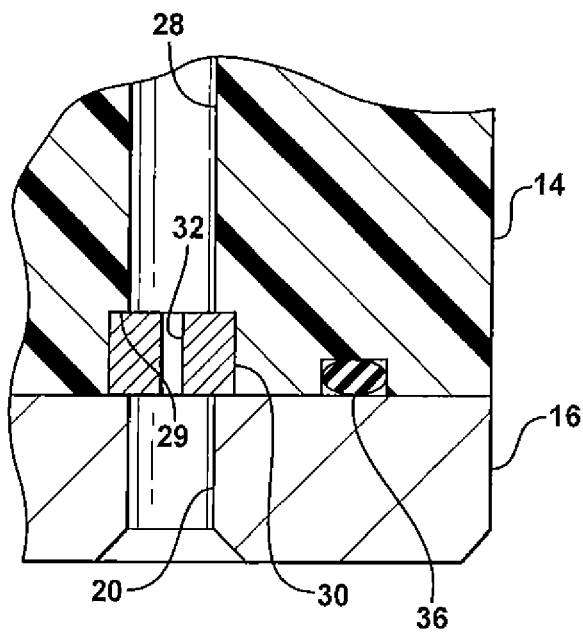
FIG. 3 is a detail of the nozzle of FIG. 1.

FIG. 1 shows in perspective a nozzle 10 exhibiting an axial combination of essentially cylindrical components including an aluminum base 12, a plastic nozzle carrier 14 and a cover plate 16, all held together by means of five axial screws 18.

The nozzle illustrated in FIG. 1 provides five parallel fluid jets which exit through countersunk passages 20 in the cover plate 16, the fluid passages being arranged in a generally circular pattern as hereinafter described.

Referring now to FIGS. 2-5, the nozzle 10 of FIG. 1 and its internal construction will be described in great detail.

The aluminum base 12 has a large diameter axial inlet 22 which is adapted to be connected to a conventional fitting for attachment to a water supply or to a supply of treated and/or reclaimed water with chemical additives as desired. The inlet pressure is preferably in the range of 15 to 110 psi with 60 psi being the nominal standard for conventional "city water" systems.

Figure 2:
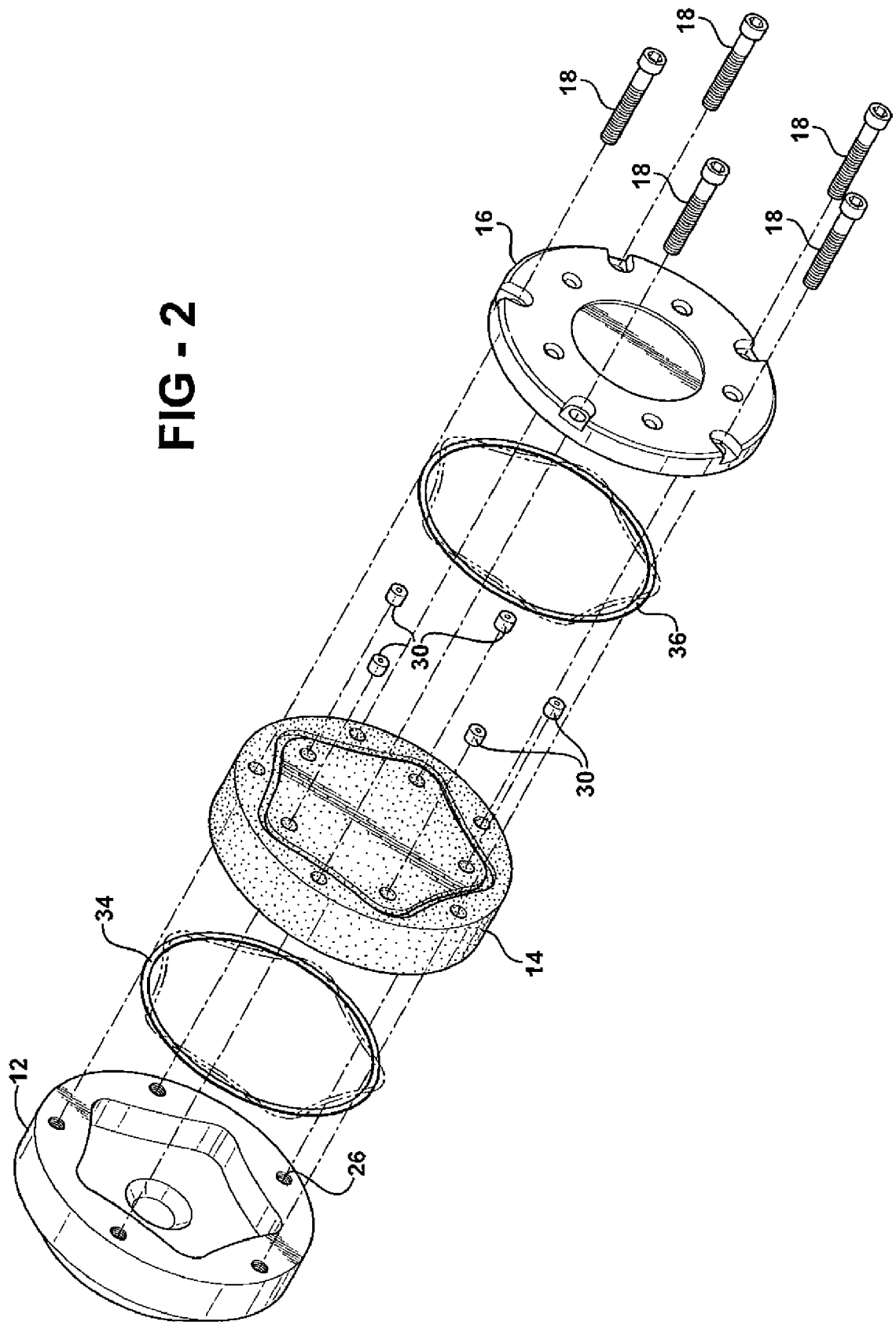
FIG. 2 is an exploded view of the nozzle of FIG. 1.
Figure 4:
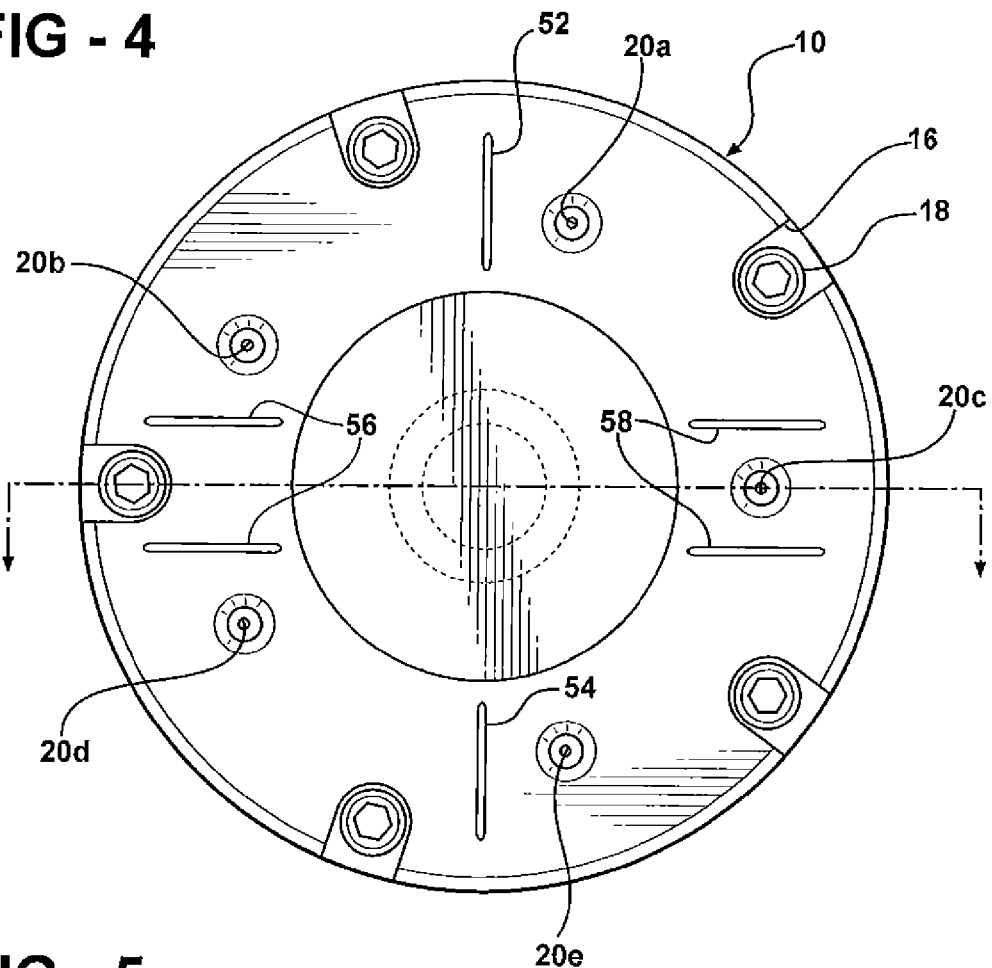
FIG. 4 is an end view of the nozzle of FIG. 1 showing the preferred nozzle spacing.

The base 12 also has formed therein a generally star-shaped chamber 24 which is in fluid communication with the inlet 22 and which opens to the face or side of the cylindrical base 12 which is opposite the inlet 22 as best shown in FIG. 2. The volume of the chamber 24 can vary, but is on the order of 250 cc in the illustrative embodiment. A circular arrangement of threaded blind holes 26 is formed in the face of the base 12 around the star-shaped chamber 24. The chamber shape is somewhat more irregular than FIG. 3 suggests.

Figure 5:
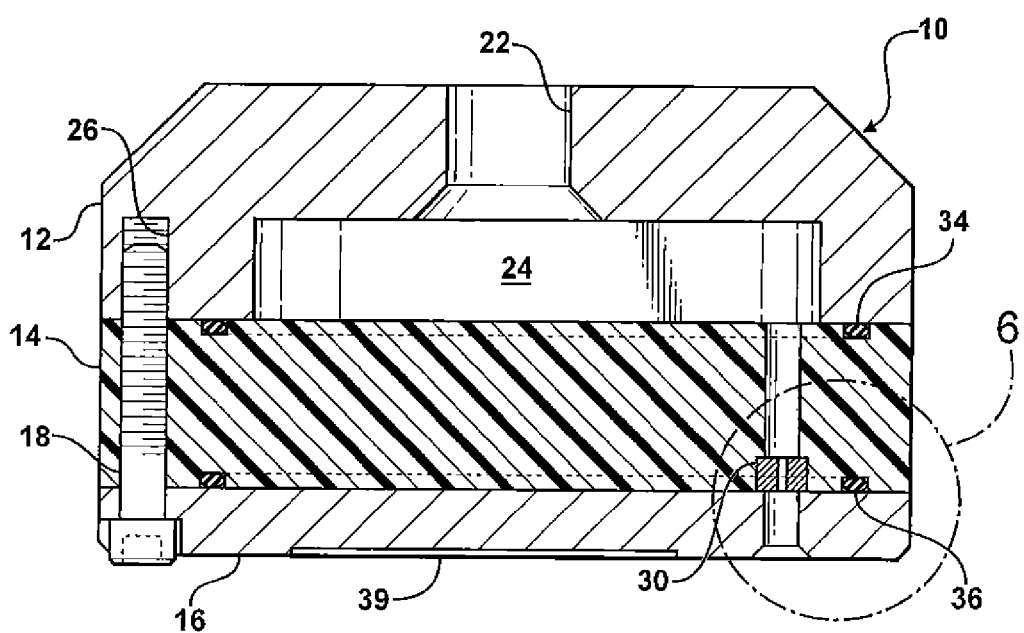
FIG. 5 is a sectional view of the nozzle of FIG. 4.

The plastic nozzle carrier 14 is also cylindrical and has opposite parallel plane faces between which a circular arrangement of parallel fluid passages 28 are formed. The fluid passages 28 are all in fluid communication with the star-shaped chamber 24 when the components 12 and 14 are sealingly mated, a seal being provided by a gasket 34 which fits into an appropriately shaped groove in the upstream face of the nozzle carrier 14. As best shown in FIG. 5 the fluid passages 28 are all approximately ¼ inch in diameter, but are increased in diameter to approximately ⅜ of an inch near the downstream face of the carrier to receive stainless steel nozzle inserts 30. The nozzle inserts have small diameter axial holes drilled or otherwise formed therein; i.e., the preferred diameter in this embodiment is 0.078 inches. The nozzle inserts 30 are of course centered relative to the fluid passages 28 and are press-fit into the larger diameter portions of passages 28 so as to seat against the shoulder 29 between the larger and smaller diameter portions. As will be described with reference to FIG. 4, the holes 26 are not uniformly circumferentially spaced.

The cover plate 16 is also cylindrical in shape and is provided with a circular array of five countersunk fluid passages 20a, 20b, 20c, 20d and 20e which are uniformly spaced along a vertical axis defined by notches 52 and 54. When the cover plate is attached to the downstream face of the nozzle carrier 14 and sealed by way of gasket 36, the nozzles 30 are in direct fluid communication with the passages 20 but, because the diameters of the passages 20 are much larger than those of the nozzle 30, highly collimated fluid passing through the jets 30 does not touch the sides of the passages 38, but flows directly therethrough at a high velocity.

Screws 18 fit into axially aligned holes in the three components 12, 14 and 16 to create a unified assembly. A shallow circular depression 39 in the exterior surface of the cover plate 16 provides an area for attachment of a plastic disc having a manufacturer's logo or the like imprinted thereon. The edge of plate 16 is beveled as shown and recesses are provided for the heads of screws 18.

In the illustrated embodiment, the nozzle 10 is approximately 6 inches in diameter by approximately 3½ inches in overall axial length. The five openings 38 are arranged on a circle of approximately 3½ inches in diameter and the nozzle inserts 30 are press fit into the plastic material of the carrier 14. The diameter of the passage 38 is approximately 5/16 of an inch. Water entering the chamber 24 exits through the passages 28 and the nozzle inserts 30 and is substantially accelerated by the reduction in flow passage diameter to create a very high exit speed. The water is also highly collimated so that each jet diverges only about an 1½ inches for every 5 feet of travel. This provides a swath of powerful cleaning action which can remove dirt, ice, mud and other debris collecting on the surfaces of an automobile or the wheels or undercarriage thereof. Body 12 and plate 16 are aluminum Carrier 14 is polyethylene.

As described above, the outlets 20a, 20b, 20c, 20d and 20e are not uniformly circumferentially spaced but, instead, are spaced such that the distances between outlets measured vertically along a diameter drawn through notches 52 and 54 are all the same. In this embodiment, notches 56 and 58 are milled into the face of the plate 16 to indicate the direction of relative motion between the plate 16 and a vehicle at which the nozzle directs fluid. The nozzle passages 20a, 20b, 20c, 20d and 20C are arranged in a circular pattern chosen to make the distances between passages along the alignment axis of notches 52, 54 equal; i.e., the vertical distance between nozzle passages 20a and 20b is the same as the vertical distance between passages 20b and 20c, and so on. Also, if a second nozzle is arranged immediately below nozzle 10 and its vertical axis aligned with the vertical axis of notches 52, 54, the distance from passage 20e to the highest passage in the lower nozzle will also equal the vertical passage spacing of nozzle 10. In this fashion, continuity of spacing is realized in stacks of nozzles.

Figure 6:
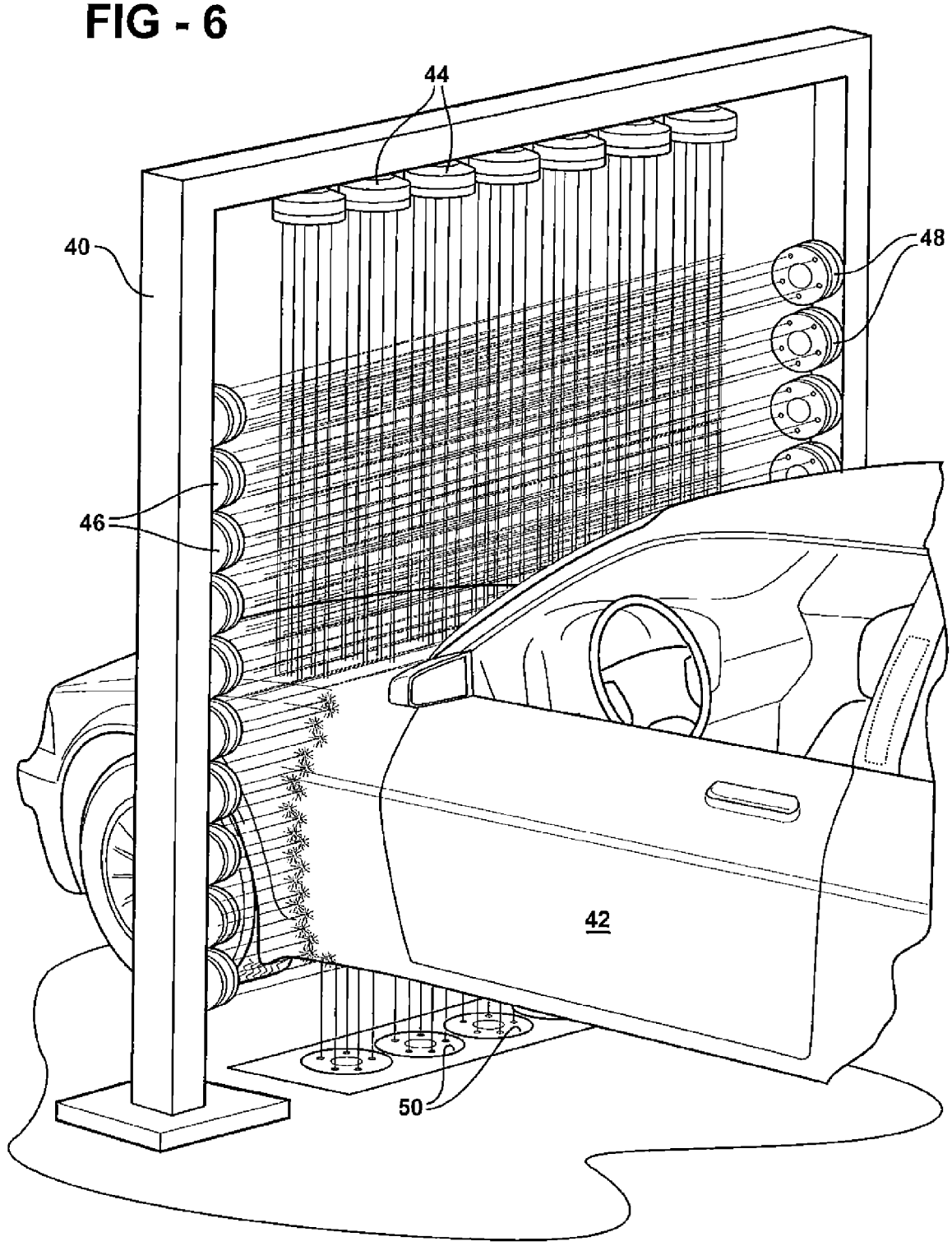
FIG. 6 is a perspective view of a carwash system using arrays of the nozzles of FIGS. 1-5.

Turning now to FIG. 6, there is shown an inverted U-shaped arch 40 made of hollow metal beams and of such dimensions as to permit an automobile 42 of conventional size to pass therethrough. The support arch 40 carries an array 44 of nozzles all of which are identical to the nozzle 10 shown in FIGS. 1-5. The seven nozzles are arranged side by side to provide a substantially continuous curtain of high velocity cleaning fluid directed downwardly on the horizontal surfaces, windshield and back light of the vehicle 42. Pipes, not shown, are arranged inside of or externally of the beams in the arch 40 to supply water and/or chemical solution to the nozzles. All of the spray patterns touch or slightly overlap the patterns of adjacent outlets so there is no area of the vehicle left uncleaned.

The arch 40 also carries laterally opposite arrays 46 and 48 of nozzles identical to the nozzle 10 of FIGS. 1-5. In the laterally opposite arrays 46 and 48, the nozzles direct water horizontally toward the side surfaces, windows and wheels of the vehicle 42. The lateral distance between the outlets of the nozzles in the arrays 46 and 48 and the side surfaces of the vehicle 42 is preferably on the order of 1½ to 3 feet.

A fourth array 50 of nozzles is disposed under the arch 40 so as to direct adjacent streams or jets of cleaning fluid upwardly into the undercarriage of the vehicle 42. This array is divided to allow room for conveyor, not shown.

While the application of the nozzle of the present invention is shown in FIG. 6 to include a fixed arch 40, it is to be understood that the nozzles may also be arranged in side by side contiguous arrays on a rollover arch or on a robot which travels around all or some part of the vehicle. The water jet/nozzle arrays may be used in an initial cleaning station of a multi-station progressive car wash to remove heavy dirt and debris prior to the subsequent soaping, scrubbing and rinsing stations. Alternatively, a station applying chemical to the vehicle 42 may precede the high velocity multi-jet nozzle installation so as to enhance the cleaning action. Nozzles 10 may also be grouped on opposite sides of the vehicle to wash wheels and rocker panel areas. Various other arrangements and applications will occur to those skilled in the art.

What is claimed is:

1. A high-velocity, multiple jet spray nozzle for car wash applications comprising:

a base having a fluid inlet in one side and a chamber opening to an opposite side and in fluid communication with the inlet;

a nozzle carrier having a first side and a second side and a plurality of parallel straight sided fluid passages formed therein between the first and second sides, each of said fluid passages having an end portion of greater diameter than the rest of the passage so as to define an internal shoulder, the first side of the nozzle carrier being sealingly attached to the opposite side of the base around the open chamber such that the fluid passages are in fluid communication with the chamber;

plurality of inelastic nozzle inserts disposed in the end portions of the nozzle carrier fluid passages adjacent the second side and abutting said shoulders and having straight sided passages formed internally therein of substantially smaller internal diameter than the internal diameters of the fluid passages in the nozzle carrier;

said inserts having a length which is smaller as compared to the overall length of said passages; and a cover plate sealingly attached to the second side of the nozzle carrier and having a plurality of straight sided fluid passages formed therein in alignment with and in fluid communication with said nozzle inserts; the cover plate fluid passages having diameters which are substantially larger than the inside diameters of the insert fluid passages, but smaller than the outside diameter of the inserts thereby to trap the inserts between said cover plate and said shoulders.

2. The nozzle described in claim 1 wherein indicia is placed on said cover plate to define a mounting orientation, said passages being arranged to lie exclusively in a circular pattern around said cover plate and extending into both sides of a diameter through said pattern, said passages being individually progressively spaced in relation to said diameter and on opposite alternate sides thereof in relatively uniform increments of distance measured along said diameter such that a vehicle passing said nozzle at right angles to said diameter encounters a substantially continuous curtain of spray.

3. The nozzle of claim 1 wherein the inserts are metal.

4. The nozzle of claim 1 wherein the carrier is made of plastic.

5. The nozzle of claim 1 further including gaskets sealingly disposed between the opposite surfaces of the nozzle carrier and the base and cover plates respectively.

6. The nozzle of claim 1 further including a plurality of axially arranged parallel screws securing together and passing through each of the base, nozzle carrier and cover plate.

7. A high velocity multiple jet spray nozzle array for car wash applications comprising:

a support;

a plurality of high velocity multiple jet spray nozzles mounted on the support for directing parallel adjacent and incrementally spaced streams of water toward a vehicle to be washed, each of said nozzles comprising:

a base having a fluid inlet in one side and a chamber opening to an opposite side and in fluid communication with the inlet;

a nozzle carrier having a first side and a second side and a plurality of parallel internally straight sided fluid passages formed therein between the first and second sides, the first side of the nozzle carrier being sealingly attached to the opposite side of the base around the open chamber such that the fluid passages are in fluid communication with the chamber, said passages having end portions of a greater diameter than the straight sided fluid passages in which they are formed thereby to define a shoulder in each passage;

a plurality of inelastic nozzle inserts disposed in said larger diameter end portions and abutting said shoulders in the carrier fluid passages adjacent the second side and having straight sided passages formed therein of substantially smaller internal diameter than the internal diameter of the fluid passages in the nozzle carrier; and a cover plate sealingly attached to the second side of the nozzle carrier to trap the inserts between the cover plate and the shoulders and having a plurality of fluid passages formed therein in alignment with and in fluid communication with said nozzle inserts; the cover plate fluid passages having diameters which are substantially and uniformly larger than the diameters of the insert fluid passages.

8. The apparatus defined in claim 7 wherein the flow passages of the nozzle carrier are arranged along a circumference of a circle with non-uniform circumferential spacing between the flow passages such that the distances between the nozzle inserts along a diameter of the cover plate are incrementally uniform; said diameter being shown by indicia on the cover plate.

9. The apparatus of claim 7 wherein the inserts are stainless steel.

10. The apparatus of claim 7 wherein the nozzle carriers are made of plastic.

11. The apparatus of claim 7 further including gaskets sealingly disposed between the base, nozzle carrier and cover plates of the respective nozzles.

12. The apparatus of claim 7 further including for each nozzle a parallel axial arrangement of screws securing the components of the nozzles together in a unitary fashion.

* * * * *